United States Patent
Kianovski et al.

(10) Patent No.: US 9,098,633 B2
(45) Date of Patent: Aug. 4, 2015

(54) APPLICATION TESTING

(75) Inventors: Ludmila Kianovski, Ashdod (IL); Roni Daniel, Gedera (IL); Kobi Shahar, Rishon-Lezion (IL); Eitan Robinzon, Netanya (IL); Chen Cozocaru, Rishon-Lezion (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 845 days.

(21) Appl. No.: 13/227,153

(22) Filed: Sep. 7, 2011

(65) Prior Publication Data

US 2013/0060507 A1 Mar. 7, 2013

(51) Int. Cl.
*G06F 9/44* (2006.01)
*G06F 11/36* (2006.01)

(52) U.S. Cl.
CPC ............ *G06F 11/3684* (2013.01); *G06F 11/36* (2013.01); *G06F 11/3668* (2013.01); *G06F 11/3672* (2013.01); *G06F 11/3688* (2013.01)

(58) Field of Classification Search
CPC ............ G06F 11/3684; G06F 11/3672; G06F 11/3688; G06F 11/3604; G06F 11/36; G06F 11/3668
See application file for complete search history.

(56) References Cited

U.S. PATENT DOCUMENTS

| | | | |
|---|---|---|---|
| 6,997,418 B1 | 2/2006 | Sanzone | |
| 7,681,180 B2* | 3/2010 | de Halleux et al. | 717/124 |
| 8,037,453 B1* | 10/2011 | Zawadzki | 717/123 |
| 8,312,436 B2* | 11/2012 | Barry et al. | 717/135 |
| 8,578,336 B1* | 11/2013 | Wiradarma et al. | 717/125 |
| 2004/0103396 A1* | 5/2004 | Nehab | 717/127 |
| 2004/0143819 A1* | 7/2004 | Cheng et al. | 717/125 |
| 2006/0010426 A1* | 1/2006 | Lewis et al. | 717/124 |
| 2007/0094541 A1* | 4/2007 | Kang | 714/38 |
| 2008/0222609 A1* | 9/2008 | Barry et al. | 717/124 |
| 2008/0307264 A1* | 12/2008 | de Halleux et al. | 714/38 |
| 2010/0192135 A1* | 7/2010 | Krishnaswamy et al. | 717/140 |
| 2010/0281467 A1* | 11/2010 | Arteaga et al. | 717/126 |
| 2011/0209124 A1* | 8/2011 | Kaur | 717/126 |
| 2013/0227528 A1* | 8/2013 | Mathew et al. | 717/124 |

FOREIGN PATENT DOCUMENTS

| | | | |
|---|---|---|---|
| JP | 2007 265263 A | 10/2007 | |
| JP | 2010 102446 A | 5/2010 | |
| KR | 2008 0042659 A | 5/2008 | |

OTHER PUBLICATIONS

Rutherford, Matthew J., et al., "A Case for Test-Code Generation in Model-Driven Systems", 2003, pp. 377-396.*
Cheng, Adriel et al., "A Software Test Program Generator for Verifying System-on-Chips", 2005, pp. 79-86.*

(Continued)

*Primary Examiner* — Thuy Dao
*Assistant Examiner* — Christopher Franco

(57) ABSTRACT

A process application layer receives a command that define a generic test for an application under test. A test code generator transforms the command into test engine instructions that exercise the generic tests on the application under test.

17 Claims, 8 Drawing Sheets

(56) References Cited

OTHER PUBLICATIONS

Shan, Lijun, et al., "Generating Structurally Complex Test Cases by Data Mutation: A Case Study of Testing an Automated Modelling Tool", 2009, pp. 1-20.*

Neema, Sandeep, et al., "Automated Test Case Generation for Code Generators based on Graph-Transformation Rules", 2006, pp. 1-17.*

Torsel, Arne-Michael, "Automated Test Case Generation for Web Applications from a Domain Specific Model", 2011, pp. 137-142.*

Malekzadeh, Mehdi, et al., "An Automatic Test Case Generator for Testing Safety-Critical Software Systems", 2010, pp. 163-167.*

SoftPedia, "Framework for Automated Testing of Distributed Systems"; http://www.softpedia.com/get/Programming/Components-Libraries/BizUnit.shtml, Retrieved Sep. 7, 2011, pp. 1-2.

BizUnit—Framework for Automated Testing of Distributed Systems; http://busunit.codeplex.com/discussions/81596?ProjectName=bizunit, Retrieved Sep. 7, 2011, p. 1.

Koopman, et al., "Gast: Generic Automated Software Testing", The Netherlands Nijmegen Institute for Information and Computing Sciences, Sep. 2002, pp. 1-17.

* cited by examiner

| COMPONENT | ID —540 | NAME —544 | DESCRIPTION —550 | DESIGNER —554 | DATE —560 | COVERAGE —564 | STATUS —570 | PARAMETERS —574 | EXT —580 —590 |
|---|---|---|---|---|---|---|---|---|---|
| ROW 1 —510 | | | | | | | | | |
| ROW 2 —520 | | | | | | | | | |
| ⋯ | | | | | | | | | |
| ROW M —530 | | | | | | | | | |

500 — EXAMPLE TEST TABLE

FIG. 5

| RUN MARK | RT | TEST ID | PROCESS POSITION | MODULE | PROC ID | PROC NAME | PROCESS DESC. | PARAMETERS | EXT |
|---|---|---|---|---|---|---|---|---|---|
| ROW 1 | | | | | | | | | |
| ROW 2 | | | | | | | | | |
| ROW P | | | | | | | | | |

FIG. 6

EXAMPLE PROCESS TABLE

| RUN MARK | RT | HOST | PROCESS ID | FUNCTION POS. | DESC. | EXPECTED RESULT | ACTUAL VALUE | FN | PARAMETERS |
|---|---|---|---|---|---|---|---|---|---|
| ROW 1 →710 | | | | | | | | | |
| ROW 2 →720 | | | | | | | | | |
| | | | | ••• | | | | | |
| ROW L →730 | | | | | | | | | |

740  744  750  754  760  764  770  774  780  784

→700

EXAMPLE FUNCTION TABLE

FIG. 7

APPLICATION TESTING

BACKGROUND

In large applications, testing an application having many instructions presents a complex challenge. For instance, when analyzing the numerous interactions and configurations posed by such instructions, the challenge is even greater making it difficult to reach one hundred percent testing for all combinations of instructions. Currently, there are two main methods for testing: manual and automatic. Manual tests are usually performed on the system itself which in many cases is an expensive resource. Current automatic test methods usually employ a simple "record and play" feature which consumes a lot of time for creation and maintenance and requires significant experience in automation development.

BRIEF DESCRIPTION OF THE DRAWINGS

FIG. 5 illustrates an example test table for specifying tests for an application module.

FIG. 6 illustrates an example process table for specifying processes for an application test.

FIG. 7 illustrates an example function table for specifying functions for an application process.

DETAILED DESCRIPTION

Figure 1:
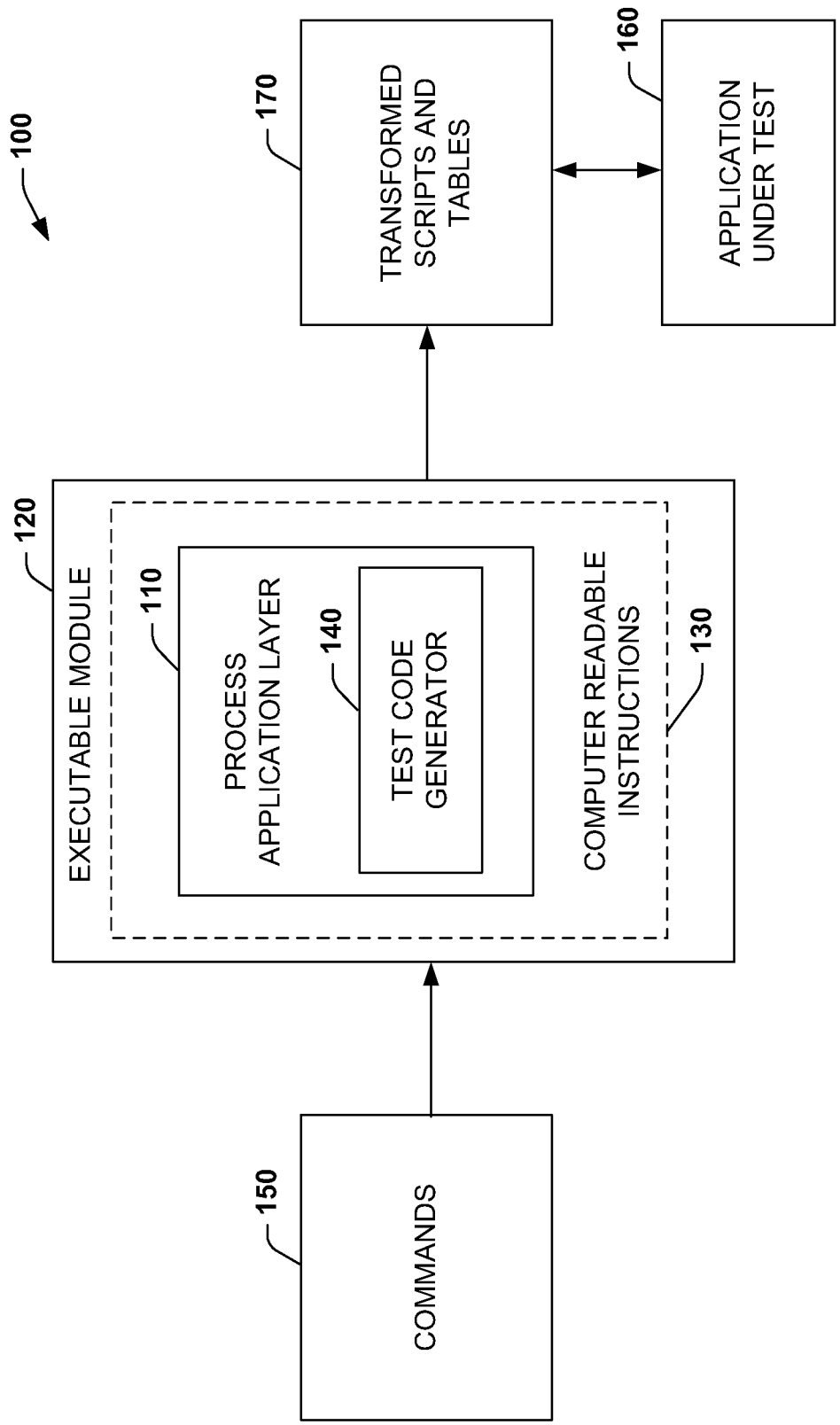
FIG. 1 illustrates an example of a process application layer to facilitate application testing.

FIG. 1 illustrates an example system 100 that includes a process application layer 110 to facilitate application testing. The system 100 includes an executable module 120 that includes computer readable instructions 130 that define the process application layer 110 and an associated test code generator 140. The process application layer 110 receives commands 150 that define generic application tests for exercising and testing an application under test 160. The commands can correspond to keyword commands, such as function keywords, process keywords, test keywords, or other types of inputs that can identify or select which application tests or test components to apply to the application under test. The test code generator 140 converts (e.g., transforms) the commands 150 into more complex scripts and tables 170 that are employed by a test engine (described and illustrated below with respect to FIG. 2) to perform automated testing on the application under test 160. Thus, test engineers can utilize simplified and straightforward commands 150 for specifying automated testing of the application under test 160 without having to understand and implement more complex test engine instructions 170. Moreover, the process application layer 110 supports a modular structure of other layers (e.g., data structures) such as modules specifying tests, further specifying test processes, and further specifying elemental or building block test functions, for example, that can be reused for testing differing applications 160 and executed in parallel to facilitate various efficiencies during automated testing.

As used herein, the term generic in the context of application tests refers to commands 150 that are basic or fundamental components to the testing of an application yet are agnostic and/or not tied to any specific application under test 160 and/or test engine instruction to exercise such application. For example, a command 150 may be generically specified as "push button." Such example "push button" function could be exercised on an application written in HTML code for example or an application interface written in C# code for example. Thus, in this example, a generic "push button" could be used across multiple different applications that received user input as a button selection yet where each application was implemented according to differing languages or designs or different types of applications. Moreover, the term generic can be agnostic toward any specific test engine instruction or implementation of instructions. Using the same example of a generic "push button" command, a transformed version of such command 150 appearing at 170 as transformed scripts and tables could appear as multiple test engine instructions such as:

Get operator input via keyboard or mouse;
Wait (operator input);
Compare operator input (left mouse button or enter key);
Return (Operator Input);
End ( );

As will be described herein, the executable module 120 can be provided as a non-transitory computer readable medium having computer readable instructions 130. This includes the process application layer 110 to receive commands 150 that define generic tests for the application under test 160. The test code generator 140 operates with the process application layer 110 to transform the commands 150 into test engine instructions at 170 that correspond to the commands and that exercise the generic tests on the application under test 160. The commands 150 can represent simplified testing instructions such as "push button," "open window," and "execute control function," for example, where such instructions represent desired testing functionality for the application under test 160. After the instructions specified by the commands 150 have been processed by the process application layer 110, the test code generator 140 produces transformed scripts and tables 170 that cause an associated test engine to exercise the application under test 160. As will be described below, the application under test 160 is typically executed on a simulator and operated via the transformed scripts and tables 170 from the respective test engine to emulate execution of the application.

The system 100 and process application layer 110 provides a methodology and environment for structured software testing automation that includes a modular, keyword, and data driven framework. The process application layer 110 provides a methodology of building modular automated tests, where each test contains processes (e.g., process keyword commands 150) that can be reused and parameterized thus supporting a data-driven approach. Each process can include a set of functions (e.g., function keyword commands 150) that perform a basic operation or validation for the application under test 160 or can also include internal process or test calls. The system 100 offers the ability to develop automatic script tests and store features tests with generic terminology specified by the keyword commands 150. This can serve automation users in efficiently translating test design procedures into functional scripts that are easy to maintain and to reuse. Application tests can be divided into groups with merged SQL database/Access database, for example, and can perform a variety of infrastructure activities. The system 100 and process application layer 110 also enables graphical user interface (GUI) objects that are identified at run time by providing a unique property of the object, for example.

As described herein, the process application layer 110 can include several structural layers that serve to build and run compound tests. As will be described below, a functional layer holds a pool (e.g., a library) of test functions that can be called by the higher layers such as a process layer and a test layer, for example. Functions can be employed to locate and manipulate objects for the application under test 160 in real time execution runs that serve various technologies. For example, a command 150 to "push" an interface button on a GUI can be executed on a platform that utilizes JAVA code in one example or utilizes HTML in another example. The "push button" command is written generically via the command 150 yet converted to the appropriate test command function by the test code generator 140.

A test layer associated with the process application layer 110 can call functions in compound order to test similar or differing application designs. For example, a test layer in the process application layer 110 can specify a set of processes that, as a whole, represents an "end-to-end" testing procedure. A process layer in the process application layer 110 can specify a basic entity that includes calls to functions in order to perform frequent tasks which are too complicated (or even unsuitable) to implement as a function. As noted above, an aspect is to maintain generic processes, tests, and functions, in order to reuse such testing functionality in the future and across similar or dissimilar coding platforms and/or test engine designs. In general, functions are the simplest components of the process application layer 110. Functions provide a mechanism for performing basic tasks, such as pressing a button, entering a value, and navigating through menu items, for example. Such modular layer functionality for the process application layer 110 (e.g., modules, tests, processes, functions) will be illustrated and described in more detail below with respect to FIG. 4.

For purposes of simplification of explanation, in the present example, different components of the system 100 are illustrated and described as performing different functions. However, one of ordinary skill in the art will understand and appreciate that the functions of the described components can be performed by different components, and the functionality of several components can be combined and executed on a single component. The components can be implemented, for example, as computer executable instructions (e.g., software, firmware), hardware (e.g., CPU, an application specific integrated circuit), or as a combination of both. In other examples, the components could be distributed among remote devices across a network or within a cloud computing environment, for example.

Figure 2:
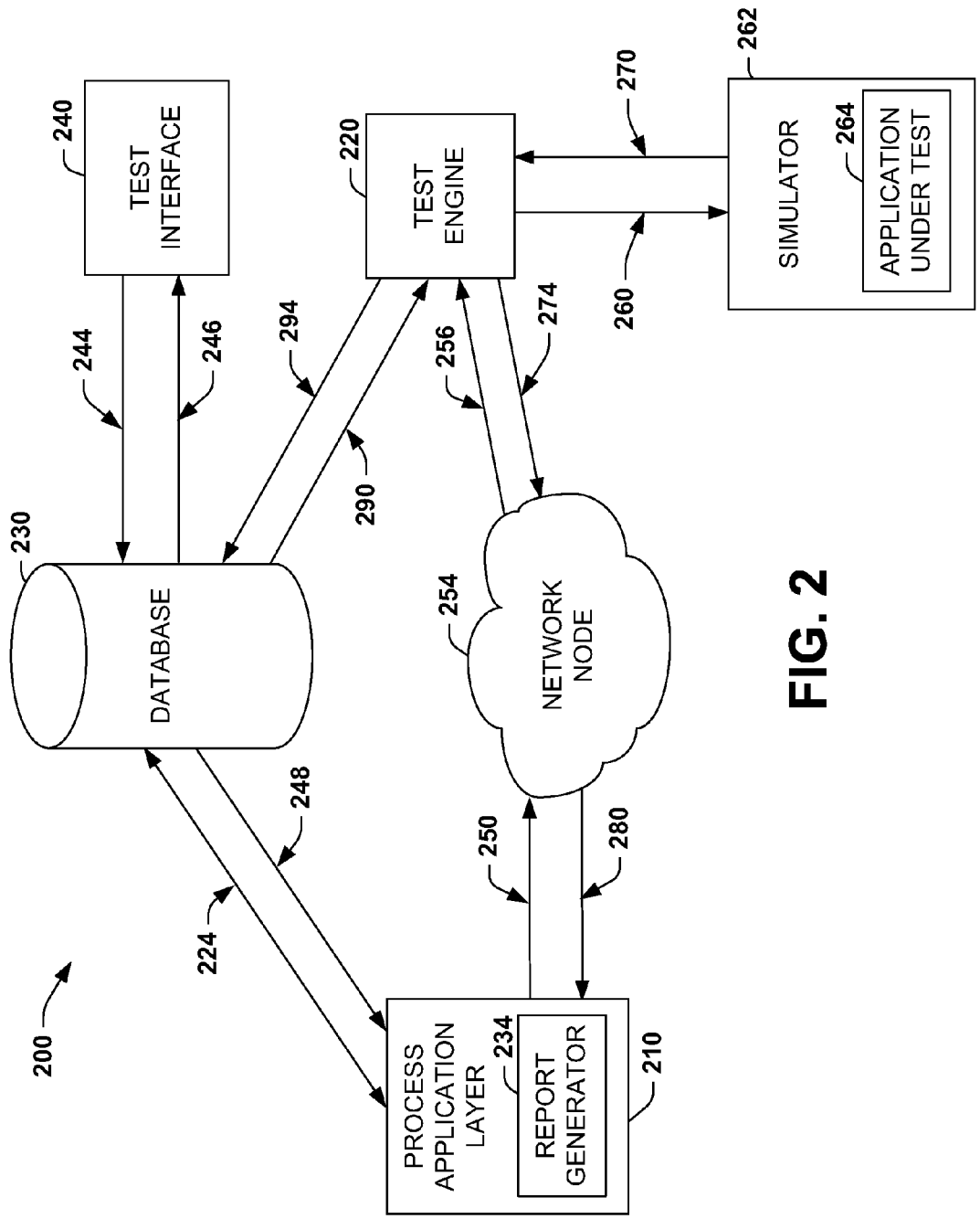
FIG. 2 illustrates an example of an automated testing system that employs a process application layer to facilitate automatic application testing.

FIG. 2 illustrates an example of an automated testing system 200 that employs a process application layer 210 to facilitate automatic application testing and analysis. As used herein, the term automatic indicates that an application is generally tested according to automatic methods and substantially without human interaction. Thus, if an interface were tested, for example, the various functions of the interface such as buttons, controls, pull-down menus, tabs, and so forth would be tested via a test engine 220 that executed testing instructions to operate the interface in lieu of an operator manually testing such functionality. It is to be appreciated however that automated and manual tests can be performed in accordance with the process application layer 210 described herein.

As shown, the process application layer 210 queries for test structures to execute at 224 from a database 230 and returns tests, processes, and functions results via a report generator 234 to the database. A test interface 240 edits the respective tests, processes and functions at 244 and receives current test, process, and function results from the database at 246. After the process application layer 210 receives corresponding test structures at 248 in response to the query 224 from the database 230, function calls having associated parameters are sent at 250 to a network node 254. The test engine 220 reads the function calls and parameters at 256 and executes the functions at 260 in accordance with a simulator 262 that emulates or simulates an application under test 264. The test engine 220 employs the function calls and parameters at 256 to execute test functions at 260 which exercise the simulator 262 and further which emulates the application under test 264. A result verification is returned at 270 to the test engine 220 from the simulator 262, where function results are sent at 274 to the network node 254. Function results are read from the network node 254 at 280 by the process application layer 210, where the report generator 234 returns results at 224 to the database 230. As shown, the test engine 220 interacts with the database 230 by getting values at 290 and setting values at 294, where such values are relevant to functions that are operative with a data table stored on the database 230. The system 200 can also support multiple test engines and simulators, two or more of which can operate concurrently. Thus, such engines and simulators could cooperate to exercise the application under test 262 and/or exercise multiple applications under test in a concurrent manner.

Although not shown, a processing unit and associated memory can be provided to execute the process application layer 210, the test interface 240, the database 230, the test engine 220, the simulator 262, and the application under test 264. As described above, the test interface 240 can generate generic scripts and parameters to define a test for an application. The process application layer 210 converts the generic scripts and parameters into test engine instructions that are stored in a data structure on the database 230, wherein the data structure further comprises a module structure to identify a collection of commands related to the test engine instructions, wherein each module structure includes a test structure describing a test for the module structure, wherein each test structure includes a process structure describing a process for the test structure, and wherein each process structure includes a function describing a basic operation to be tested on the application 264. The test engine 220 executes the test engine instructions in order to test the application 264 and the simulator 262 emulates the application and responds to the test engine instructions during the test for the application.

Figure 3:
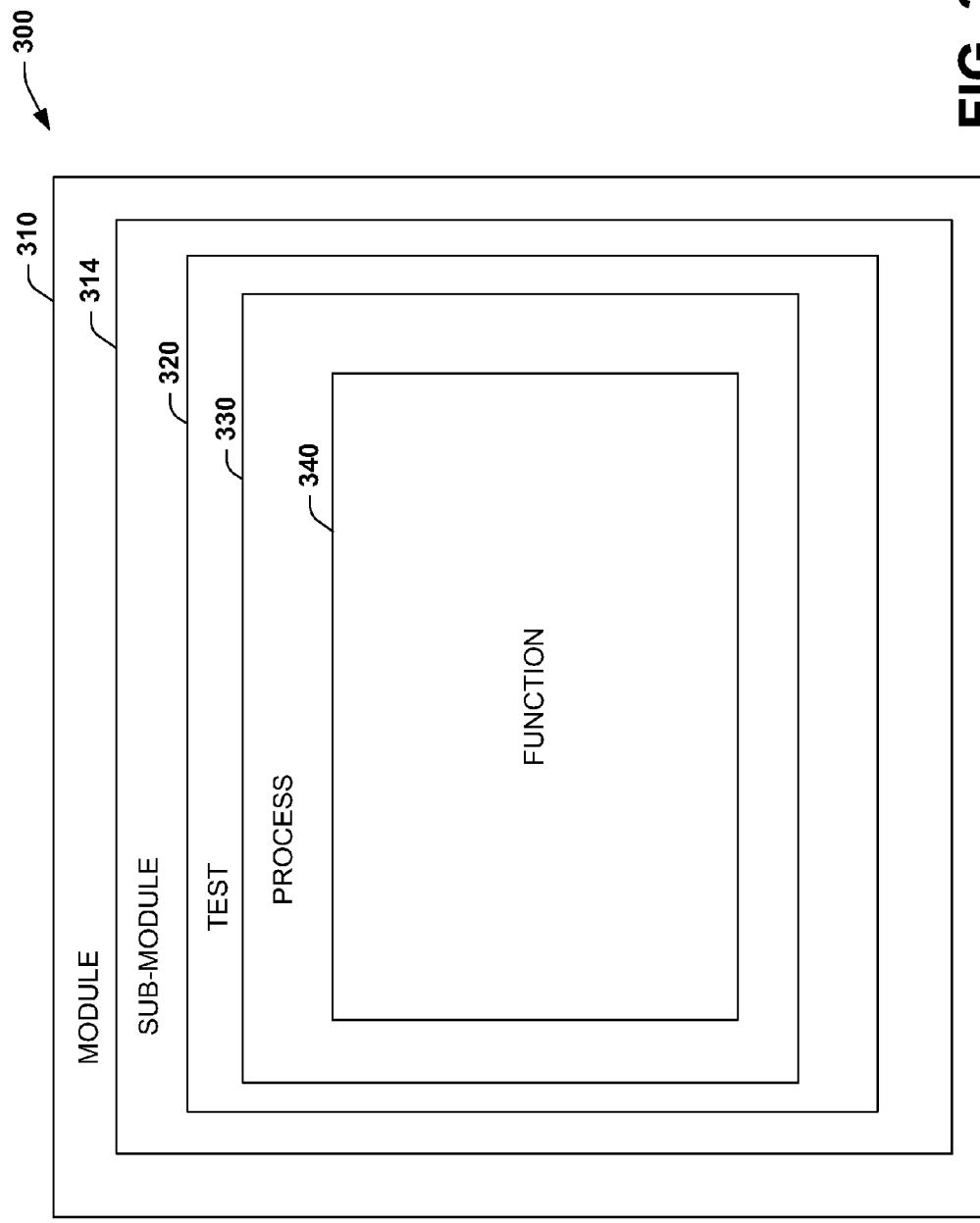
FIG. 3 illustrates an example of a modular template that defines test sequences for a process application layer.

FIG. 3 illustrates an example of a modular template 300 that defines test sequences for a process application layer. The template 300 includes a module 310 at the highest level of definition for a test sequence. Such module can specify various test blocks such as interface, engine, process handling, printing, and so forth, where each module tests a differing portion of an overall application program. Each module 310 can include a sub-module 314 that can include a test layer 320 that describes what functionality is to be tested or exercised according to the parameters and commands specified by the respective module. As shown, each test layer 320 can include a process layer 330 that describe the steps to be executed for a given test. Each process layer 330 in turn can be described by a function layer 340 that is considered the basic or elemental building block (e.g., component) to exercise or test a given application. Such function layer 340 can include various functions such as pressing a button, entering a value, navigating though a menu, controlling a system feature, executing an application within a system, and so forth.

The function layer 340 can include substantially any description of an action or operation that can be performed by an application. As will be described below with respect to FIGS. 5-7, each of the test layer 320, process layer 330, and function layer 340 can be described by a data structure such as database table, for example. The module 310 is typically specified by a name and accessed via an interface menu provide by an associated process application layer, where a database program such as SQL, for example, relates the module name with one or more associated test layers 320, process layers 330, and function layers 340. As can be appreciated, more or less designations for template structures can be employed than illustrated at 300. For example, the process application layer could specify keyword commands via a single testing layer or via commands that are in other associated layers above the four layers shown in the example template 300.

Figure 4:
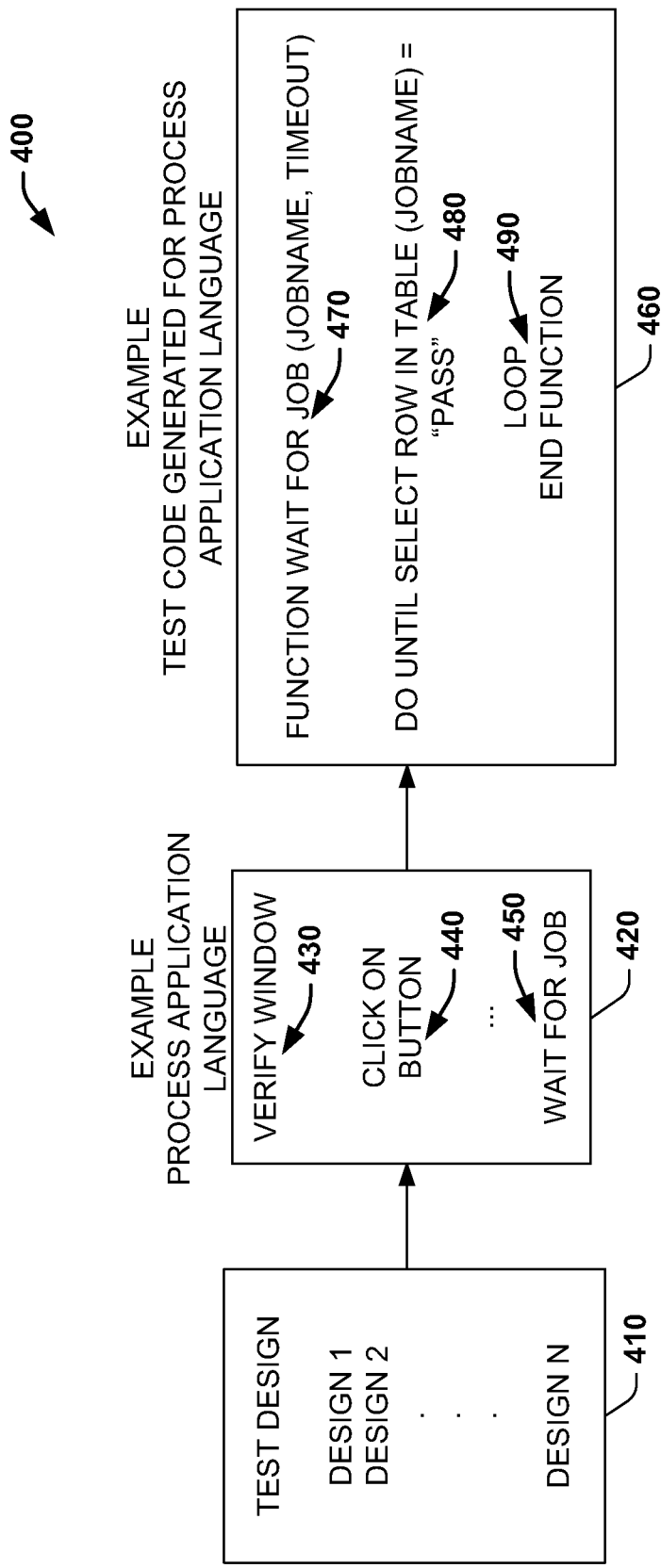
FIG. 4 illustrates an example of a testing sequence of a process application language and test code generation for application testing.

FIG. 4 illustrates an example of a testing sequence 400 of a process application language and test code generation for application testing. At 410, a test design block is illustrated that represents descriptions of tests for differing applications designs shown as design 1, design 2, and design N, where N is a positive integer representing a number of designs. Each design 410 can represent one of the modules described above with respect to FIG. 3, for example. Output from the design block 410 is shown as generic test instructions utilized by a process application language 420. In this example, the language 420 shows three generic testing functions shown as verify window 430, click on button 440, and wait for job 450. After the process application language has been processed by a process application layer, test code is generated at 460. As shown the test code 460 includes an instruction function wait for job (jobname, timeout) at 470, a do until select row in table (jobname)="pass" at 480, and a loop and end function statement illustrated at 490. As can be appreciated, a plurality of such process language instructions 420 and corresponding test code instructions can be generated at 460.

FIG. 5 illustrates an example test table 500 for specifying tests for an application module. As shown, the table 500 can include rows 1-M demonstrated at 510, 520, and 530, where M is a positive integer representing a number of rows and where each row specifies a different test for an application. Columns for the table 500 represent various aspects (e.g., parameters) of the respective tests. At 540 of the table 500, a component column specifies that a test belongs to a component (or module). At 544 of the table 500, a Test ID column (ID) indicates a test index that is created for each new test. At 550 of the table 500, a Test Name represents the test content. At 554 of the table 500, a Test Description explains the test purposes and its themes, parameters, and so forth. At 560 of the table 500, a Designer column specifies a user name that designs the tests. At 564 of the table 500, a date column specifies a date that a test was created or modified. At 570, a percentage can be specified relating to the amount of an application that is tested by a given test. At 574 of table 500, a status column can indicate what stage a test is currently in (e.g., design stage, ready, and so forth). At 580 of table 500, one or more columns can be provided for associated test parameters. At 590, an external table column can be provided which represents a parameters table for the test and can be associated with a number of times a test can run (e.g., the same number as the number of rows in the table).

FIG. 6 illustrates an example process table 600 that can be employed for specifying processes for an application test. As shown, the table 600 can include rows 1-N at 610, 620, and 630, where N is a positive integer representing a number of rows and where each row specifies a different process for an application test. Columns for the table 600 represent various aspects of the respective processes. At 640 of the table 600, a Run Mark column represents run mode, where the symbol X represents not running, ✓ represents running mode, whereas a, b, c, . . . represents a process that runs with data driven parameters. At 644 of table 600 a Relevant to (RT) column is empty if the process relates to all projects, or specifies a name or ID for specific projects that are related to the process. At 650 of table 600, a Test ID column indicates under what test the process is written. At 654 of table 600, a Process position column indicates a process order under the respective test. At 660 of table 600, a Module column indicates a name of the module the process is associated with. At 664 of table of table 600, a Process ID column assigns a unique identifier or number for each process. At 670 of the table 600, a process Name column represents the process content. At 674 of the table 600, a Process description column explains the process purposes and its parameters. At 680 of table 600, one or more columns can be provided for associated process parameters. At 690, an external table column can be provided which represents a parameters table for the process and can be associated with a number of times a process can run (e.g., the same number as the number of rows in the table).

FIG. 7 illustrates an example function table 700 that can be employed for specifying functions for an application process. As shown, the table 700 can include rows 1-L at 710, 720, and 730, where L is a positive integer representing a number of rows and where each row specifies a different function for an application test. Columns for the table 700 represent various aspects of the respective functions. At 740 of the table 700, a Run Mark column represents run mode, where the symbol X represents not running, ✓ represents running mode, whereas a, b, c, . . . represents a process that runs with data driven parameters. At 744 of the table 700, a Relevant to column is empty if the function represents all projects, and a drop down menu can be provided that represents specific projects that can be selected that a function may be related to. At 754 of the table 700, a Process ID column indicates the process level a function is related to. At 760 of the table 700, a Function position column indicates a location in the process. At 764 of table 700, a Description column explains the Process purposes and its parameters. At 770 of table 700, an expected result column can indicate a value that is expected for a given function. At 774 of table 700, an actual value column can indicate the value provided by the simulator after the function has executed. At 780 of table 700, a Function name (FN) column represents the function content. At 784 of table 700, one or more columns can be provided for associated function parameters. The parameters can include a name of a table or name of a column of attached table to process an ability to run distributed scripts by HOST column.

Figure 8:
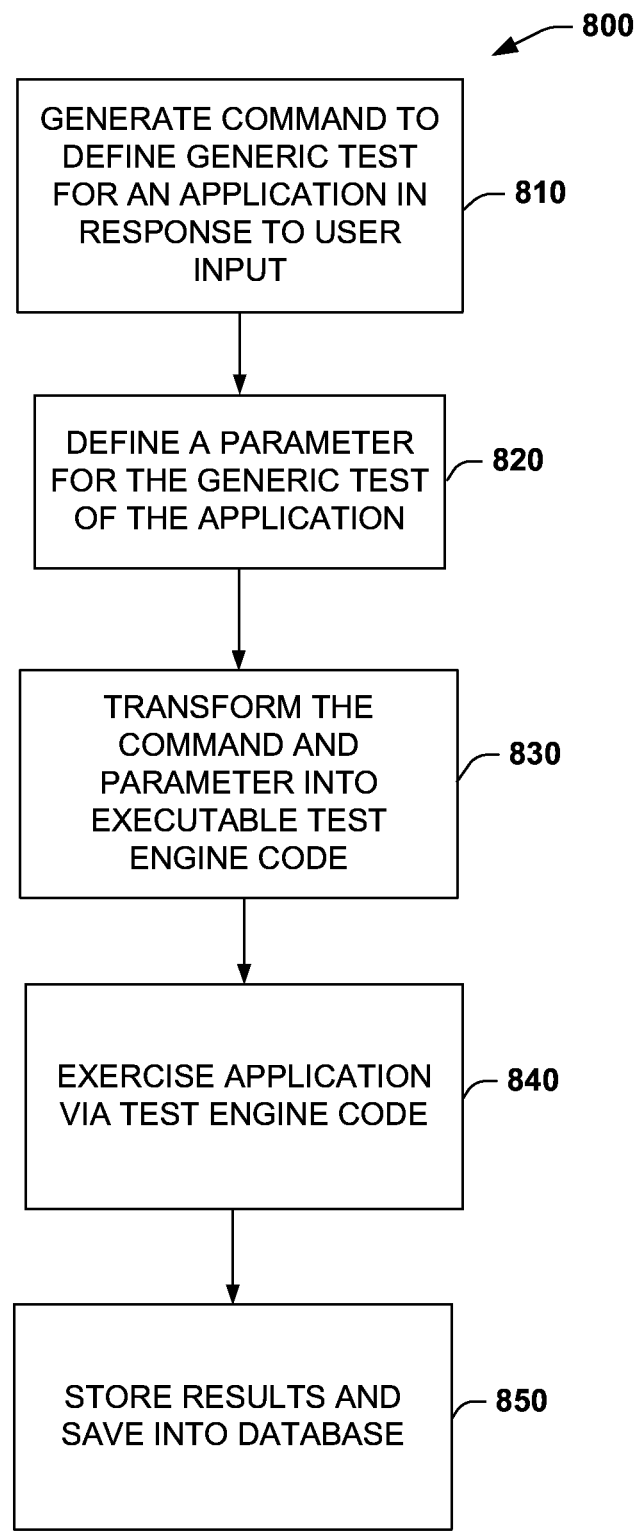
FIG. 8 illustrates an example method for automated application testing.

In view of the foregoing structural and functional features described above, an example method will be better appreciated with reference to FIG. 8. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by a processor and associated equipment, for example.

FIG. 8 illustrates an example method 800 for automated application testing. The method 800 includes generating commands that define a generic test for an application in response to user input at 810. For example, this can include providing a test interface via a process application layer to define modules, tests, processes, and/or functions that specify generic (e.g., agnostic) test routines for an application under test or test engine instance exercising such application under test. The method 800 includes defining a parameter for the generic test of the application at 820. As noted previously, this can include providing data structures such as database tables to specify such parameters. The method 800 includes transforming the command and parameter of the application into executable test engine code at 830. As described above, this can include utilizing a test code generator with the process application layer to transform the generic tests specified at 800 into the test engine code at 830. The method 800 includes exercising the application via the test engine code at 840. This can include employing a test engine to execute the test code on a simulator as described above. At 850, the method 800 includes storing results from exercising the application at 840 and storing the results in a database.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method, comprising:
generating a command to define a generic test for an application in response to user input, the generic test comprises a reusable module defining a plurality of test commands, wherein the plurality of test commands are agnostic with respect to a test engine and the application, wherein the reusable module comprises a test layer that specifies functionality of the application to be tested by a test procedure comprising the plurality of test commands,
wherein the functionality is defined by a function layer that comprises a function database table comprising a column for a run mark to indicate whether a function is running, a related to identifier to indicate to which process the function is associated, a host to identify a list of application options, a process identifier to indicate a level of the process, a function position to indicate a location in the process, a description to explain a purpose of the function, an expected result to indicate a value expected to be received from the function, an actual value to indicate test data received after the function has executed, or a function name to differentiate the function from other functions;
converting, by a processor, the plurality of test commands into the test procedure in a programming language compatible with the test engine and the application; and
performing, by the processor, an automated test of the application using the test procedure.

2. The method of claim 1, wherein the performing the automated test further comprises emulating the application via a simulator.

3. The method of claim 2, further comprising exercising the simulator via the test engine.

4. The method of claim 1, wherein the performing the automated test further comprises utilizing database tables to store the plurality of test commands and an associated parameter resulting from the automated test.

5. A non-transitory computer readable medium comprising computer readable instructions comprising:
a process application layer to define a generic test comprising a reusable module defining a plurality of test commands, wherein the plurality of test commands are agnostic with respect to a test engine; and
a test code generator to convert the plurality of test commands into a test procedure in a programming language compatible with the test engine to perform an automated test of the application;
wherein the reusable module comprises a test layer that specifies functionality of the application to be tested by the test procedure,
wherein the functionality is defined by a function layer that comprises a function database table comprising a column for a run mark to indicate whether a function is running, a related to identifier to indicate to which process the function is associated, a host to identify a list of application options, a process identifier to indicate a level of the process, a function position to indicate a location in the process, a description to explain a purpose of the function, an expected result to indicate a value expected to be received from the function, an actual value to indicate test data received after the function has executed, or a function name to differentiate the function from other functions.

6. The non-transitory computer readable medium of claim 5, wherein the plurality of test commands are stored in a plurality of rows of a database table, and
wherein the database table includes a column corresponding to the plurality of rows to enter a parameter for the plurality of test commands.

7. The non-transitory computer readable medium of claim 5, wherein the test code generator resides within the test layer that comprises a test database table, wherein the test database table comprises a column for a component name of a test, an identifier to index the test, a name to represent content of the test, a description to define a purpose of the test, a designer name for who created the test, a date to list when the test was created, a coverage percentage to describe an amount of the application that has been tested, or a status to indicate a state of development for the test.

8. The non-transitory computer readable medium of claim 5, wherein the process application layer comprises a process database table comprising a column for a run mark to indicate whether a process is running, a related to identifier to indicate a test the process is associated with, a test identifier to indicate under what test the process is written, a process position to indicate what order under the test the process is run, a module to identify the process is associated with, a process identifier to uniquely label the process, a process name to describe content for the process, or a process description to explain a purpose for the process.

9. The non-transitory computer readable medium of claim 5, wherein the test engine is to execute the test procedure on the application.

10. The non-transitory computer readable medium of claim 9, further comprising a simulator to emulate the application during the test procedure.

11. The non-transitory computer readable medium of claim 5 wherein the process application layer comprises a report generator to generate an analysis report to indicate results from the test procedure.

12. An application testing system comprising:
a memory for storing computer executable instructions; and
a processing unit for accessing the memory and executing the computer executable instructions, the computer executable instructions comprising:
a test interface parameters to define a plurality of test commands, wherein the plurality of test commands comprise generic scripts and parameters that are agnostic with respect to a programming language compatible with an application and a test engine;
a process application layer to convert the plurality of test commands into a reusable module defining the plurality of test commands, wherein the reusable module comprises a test layer that specifies functionality of the application to be tested by a test procedure comprising the plurality of test commands,
  wherein a functionality is defined by a function layer that comprises a function database table comprising a column for a run mark to indicate whether a function is running, a related to identifier to indicate to which process the function is associated, a host to identify a list of application options, a process identifier to indicate a level of the process, a function position to indicate a location in the process, a description to explain a purpose of the function, an expected result to indicate a value expected to be received from the function, an actual value to indicate test data received after the function has executed, or a function name to differentiate the function from other functions;
a test code generator to select a programming language and convert the plurality of test commands within the reusable module to a test procedure in a programming language compatible with the application and the test engine, wherein the test layer comprises the test code generator;
the test engine to execute the test procedure in order to test the application; and
a simulator to emulate the application and respond to the test procedure during the test of the application.

13. The application testing system of claim 12, wherein at least a portion of the test interface generates the generic scripts and parameters are defined based on a user input.

14. The application testing system of claim 12, wherein the reusable module comprises a plurality of blocks corresponding to a plurality of functions of the application.

15. The application testing system of claim 14, wherein the plurality of blocks correspond to the plurality of test commands,
  wherein a portion of the plurality of test commands corresponds to at least one of the plurality of functions of the application.

16. The application testing system of claim 14, wherein each of the plurality of blocks corresponds to a data structure.

17. The application testing system of claim 16, wherein the data structure comprises a database table.

* * * * *